US009881002B1

(12) United States Patent
Qureshi et al.

(10) Patent No.: US 9,881,002 B1
(45) Date of Patent: Jan. 30, 2018

(54) CONTENT LOCALIZATION

(71) Applicant: Amazon Technologies, Inc., Reno, NV (US)

(72) Inventors: Aneeb Naveed Qureshi, Seattle, WA (US); Asia Noel VanderBilt, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 634 days.

(21) Appl. No.: 14/219,934

(22) Filed: Mar. 19, 2014

(51) Int. Cl.
*G06F 17/28* (2006.01)
*G06Q 30/06* (2012.01)
*G06T 11/60* (2006.01)

(52) U.S. Cl.
CPC ......... *G06F 17/28* (2013.01); *G06Q 30/0601* (2013.01); *G06T 11/60* (2013.01)

(58) Field of Classification Search
CPC .............. G06F 17/28; G06F 17/2745; G06F 1717/289; G06F 17/289; G06Q 30/02; G06Q 10/06311
USPC ............... 705/26.1; 715/234, 723; 709/246; 704/2, 3; 700/83
See application file for complete search history.

(56) References Cited

U.S. PATENT DOCUMENTS

| | | | | |
|---|---|---|---|---|
| 6,490,547 | B1* | 12/2002 | Atkin | G06F 17/289 704/3 |
| 6,925,597 | B2* | 8/2005 | Anwar | G06F 3/1206 709/246 |
| 2008/0244381 | A1* | 10/2008 | Nicolaou | G06F 17/2745 715/234 |
| 2008/0249760 | A1* | 10/2008 | Marcu | G06F 17/289 704/2 |
| 2009/0106016 | A1* | 4/2009 | Athsani | G06F 17/289 704/3 |
| 2010/0023863 | A1* | 1/2010 | Cohen-Martin | G06Q 30/02 715/723 |
| 2011/0029103 | A1* | 2/2011 | Mann | G06F 8/38 700/83 |
| 2015/0081269 | A1* | 3/2015 | Phadke | G06F 17/289 704/2 |
| 2015/0227512 | A1* | 8/2015 | Shoshan | G06F 17/289 704/2 |
| 2016/0162478 | A1* | 6/2016 | Blassin | G06Q 10/06311 706/12 |

* cited by examiner

*Primary Examiner* — Vanel Frenel
(74) *Attorney, Agent, or Firm* — Kilpatrick Townsend & Stockton LLP

(57) ABSTRACT

A localization service may be provided to manage distribution of content including text overlays according to language codes. In some examples, the language codes include regional identifiers and language identifiers. The localization service may provide the content including translated text overlays for reproduction by client devices in accordance with descriptive data associated with the images. In some examples, the descriptive data may describe the text overlays, placement of the text overlays with respect to the content, and characteristics of the text overlays.

24 Claims, 9 Drawing Sheets

CONTENT LOCALIZATION

BACKGROUND

In some examples, particular network content may include, among other things, text elements and image elements. A designer associated with an owner of the network content may design the content in a particular language, which may include selecting and organizing different combinations of elements that make up the content. An example image element may include an image (e.g., of an item available in an electronic marketplace) with a text overlay overlaying the image (e.g., text describing the item). In some examples, the text overlay may be prepared by the designer in his or her particular language, combined with the image, and processed in some manner to produce a resulting image. In some resulting images, the text overlay may lose its textual characteristics and may become part of the image (e.g., through a flattening process). The resulting image, including the image and the text overlay, may therefore be suitable for presentation to users who understand the particular language of the designer. In some examples, the process of producing the resulting image may be repeated each time the text overlay or the image changes. The owner of the content may desire that the particular content, including the image element, also be suitable for presentation throughout the world. This may include presentation of the content in a variety of different geographic regions and in connection with a variety of different languages. The sheer number of regions and languages, in addition to the effort and complexity of producing consistent resulting images, may pose challenges to the designer, and other designers, who are responsible for designing network content.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, content localization techniques. While the disclosure describes localization of content (e.g., images), the techniques described herein are also applicable to the localization of other electronic content items (e.g., video). "Localization," as used herein and described more fully below, includes adapting elements of network content, including webpages or other electronic content items to different languages and regions throughout the world. In some examples, localization includes adapting an image including a text overlay to be dynamically reproduced in a wide variety of languages and regions throughout the world.

In one example of the present disclosure, a designer designs an image depicting a tablet device for presentation on a webpage in the region of the United States. The designer also designs a text overlay in the English language that describes features of the tablet device (e.g., volume buttons, power button, camera, etc.) which is saved in metadata associated with an image file of the image. The metadata describes a plurality of parameters of the text overlay, for example, font size, font style, font placement, etc. The text overlay is provided to a translation service which translates the text overlay according to different region/language combinations. Meanwhile, the image file, including the metadata, is provided to content localization system (hereinafter referred to as an "image localization system"). The image localization system associates the image file with a unique asset identifier and retains the image file. The translation service provides translations of the text overlay to the image localization service. In response to a request to view the webpage according to a particular region/language combination, the image localization system automatically provides the image, including a suitable translation for the region/language combination, to a client device. The client device is enabled to view the image depicting the device with the translated text overlay. The translated text overlay may also be combined prior to the request and published for individual region/language combinations.

Figure 1:
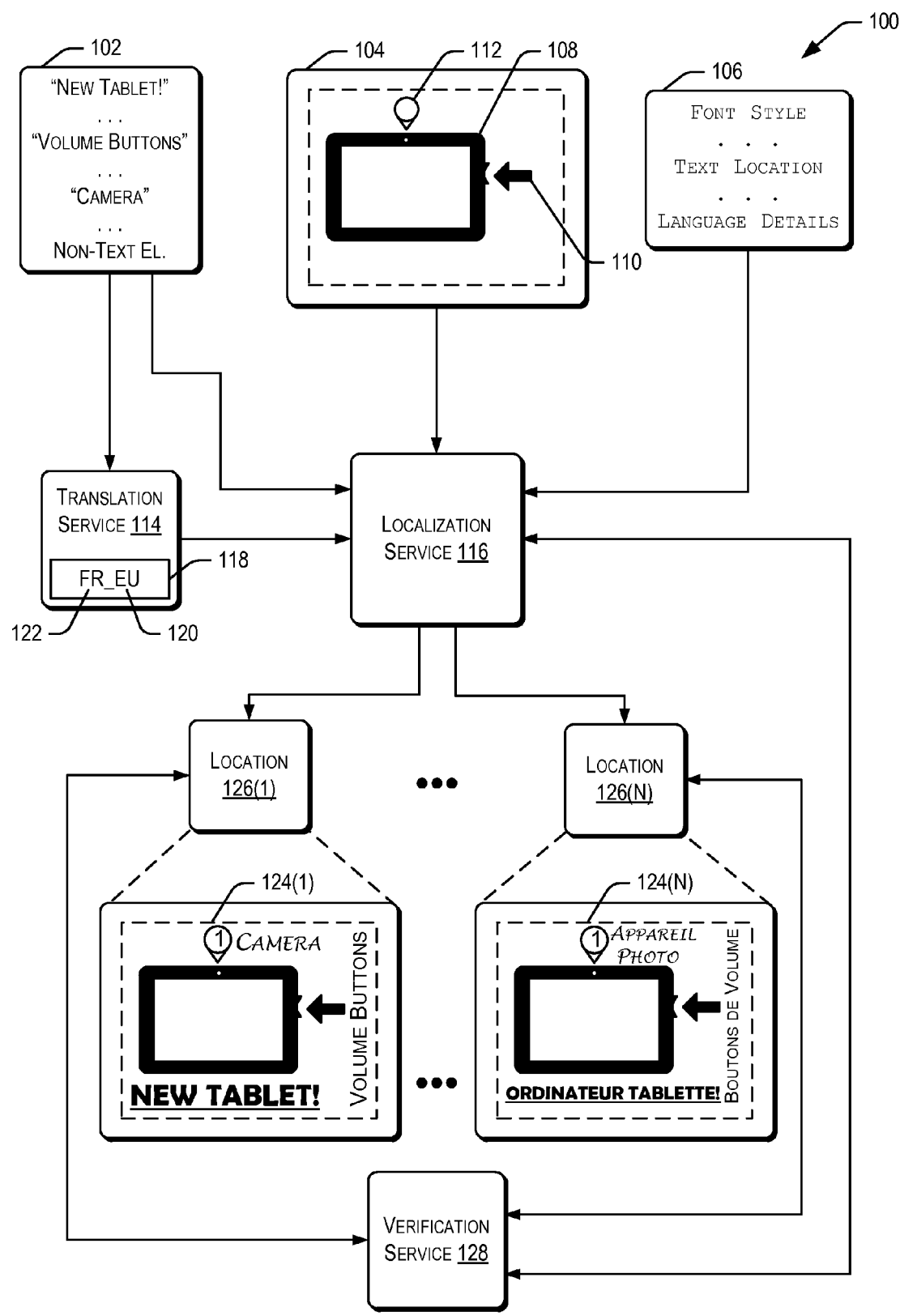
FIG. 1 illustrates an example block diagram depicting content localization techniques as described herein, according to at least one example.

Turning now to the figures, FIG. 1 illustrates a block diagram 100 depicting image localization techniques, according to at least one example. The block diagram 100 may include text overlay 102, base image 104, and descriptive data 106. In accordance with at least one embodiment, the text overlay 102, the base image 104, and the descriptive data 106 may represent abstracted elements of a completed image file including a text overlay. In some examples, the text overlay 102 may include one or more text elements or strings that may describe elements of the base image 104 and one or more non-text elements. In the block diagram 100, the text overly 102 includes example text strings "New Tablet!," "Volume Buttons," and "Camera," as well as non-text elements. Examples of non-text elements include arrows, number indicators, pointers, numbering boxes, and the like. More or fewer text strings and non-text elements may be provided as indicated by ellipses (i.e., " . . . "). Other uses of ellipses throughout this disclosure will similarly indicate a presence of more or fewer items. An outside perimeter of the base image 104 is depicted by the dashed rectangle and may include, as part of the image, item 108. In the block diagram 100, the item 108 is a tablet device which may be offered for sale in connection with an online marketplace (not shown). The base image 104 may also include examples of non-text elements, such as, arrow 110 and number indicator 112. In accordance with at least one embodiment, the arrow 110 and the number indicator 112 are included in the text overlay 102 as part of the "non-text elements." The image 103 may be any suitable raster or vector type image format including, for example, joint photographic experts group (JPEG) format, portable networks graphics (PNG) format, graphics interchange format (GIF), tagged image file format (TIFF), raw image formats (RAW), Windows bitmap (BMP) format, Netpbm format, exchangeable image file format (Exif), computer graphics metafile (CGM) format, Gerber Format, scalable vector graphics (SVG) format, and the like.

The descriptive data 106 may include data capable of describing the relationship between the text overlay 102 and the base image 104. For example, the descriptive data 106 may describe one or more parameters associated with placement of the text strings and non-text elements of the text overlay 102 with respect to the item 108 of the base image 104. In some examples, the one or more parameters may include rule parameters and characteristic parameters. The rule parameters may describe features of placement of the text overlay 102 (e.g., font spacing, character spacing, and line spacing, placement of text with respect to the base image 104, widow/orphan control, maximum and minimum number of characters, hyphenation, text and non-text boundaries, image area and selection parameters (when the base image 104 includes alternative images), special character support, text flow, directional text changes, etc.). The characteristic parameters, on the other hand, may describe characteristics of the actual text strings of the text overlay 102 (e.g., text size, text font, non-text style, text color, text highlighting, image color (when the base image 104 includes alternative images), etc.). In some examples, the descriptive data 106 may include not only parameters associated with placement and characteristics of the text overlay 102, but may also include the text strings and the non-text elements of the text overlay 102 (e.g., "New Tablet!," "Volume Buttons," "Camera," the arrow 110, and the number indicator 112). In this manner, the descriptive data 106 may describe the text elements, non-text elements, and their placement with respect to the base image 104. In the block diagram 100, the one or more parameters of the descriptive data 106 may include, among other things, "font style," "text location," and "language details." The descriptive data 106 may be any suitable descriptive language capable of describing the look, formatting, and placement of the text overlay 102 with respect to the base image 104. For example, the descriptive data 106 may include data in a text-based metadata format, cascading style sheets (CSS), page description language, and the like. In some examples, the descriptive data 106 may include one or more tags. In accordance with at least one embodiment, the descriptive data 106 may comply with one or more specifications provided by one or more metadata standards bodies.

In accordance with techniques described herein, the text overlay 102 may be provided to translation service 114. The translation service 114 may be any suitable translation service capable of translating text, and in some cases images, from a first language to a second language according to a language code. The language code 118 may be configured to identify a region and a language for a particular translation. In FIG. 1, the language code 118 may include a regional identifier 120 and a language identifier 122. The regional identifier 120 is shown as a unique combination of two letters (i.e., EU) and is separated by an underscore from the language identifier 122 which is also shown as a unique combination of two letters (i.e., FR). In accordance with at least one embodiment, the language code 118 may include any suitable arrangement of numbers, letters, and/or symbols as identifiers of language and region. In this example, the language code 118 may identify that the translation service 114 may translate the text overlay 102 from its original language to French (FR) for use in the region of Europe (EU).

In some examples, the language code 118 may be provided to the translation service 114 in the form of the descriptive data 106 corresponding to the text overlay 102 or provided by some other means. For example, the translation service 114 may maintain a plurality of language codes and instructions previously-received from the localization service 116 to determine which translations should be made for any particular text overlay. In accordance with at least one embodiment, the translation service 114 may translate the text overlay 102 into a predetermined number of languages for a predetermined number of regions. In accordance with at least one embodiment, the translation service 114 may be a component of localization service 116 and may perform similar functions as described above. In addition to receiving the text overlay 102, in some examples, the translation service 114 also receives the base image 104 and/or the descriptive data 106. With the base image 104 and/or the descriptive data 106, the translation service 114 may provide a more accurate translation because of its awareness of the context in which the text overlay 102 will be used (i.e., in connection with the base image 104 and laid out according to the descriptive data 106). At some time after receiving the text overlay 102, the translation service 114 may translate the text strings that comprise the text overlay 102. In some examples, the translation service 114 may perform many different translations of the text overlay 102 for different regions and languages, and either retain or transfer the translations to the localization service 116.

In some examples, the localization service 116 may receive translations from the translation service 114 and/or complete its own translations of the text overlay 102. In addition, the localization service 116 may receive the base image 104 and the descriptive data 106. With these, the localization service 116 may perform the image localization techniques described herein. These techniques will be discussed in more details with reference to the remaining figures. Suffice it to say that, at this point, the localization service 116 may generate one or more resulting images 124(1)-124(N) for one or more corresponding locations 126(1)-126(N). The resulting images 124 and the locations 126 are separated by " . . . " to indicate that there may be any number of resulting images. In accordance with at least one embodiment, the resulting image 124(1) may correspond to the text overlay 102, the base image 104, and the descriptive data 106 without any translation. For example, in the resulting image 124(1), the text strings of the text overlay 102 are displayed in accordance with the one or more parameters of the descriptive data 106.

The descriptive data 106 may describe, for example, the location of the text strings, the font size, the alignment, etc. of the text strings and any other parameter discussed above. In accordance with at least one embodiment, the text string "Camera" is shown in resulting image 124(1) in a particular font and placed in a particular location. Similarly, the other text strings have unique styles and placements within the resulting image 124(1). In this manner, the descriptive data 106 may describe the placement and characteristics of the text strings of the text overlay 102. Similar to the resulting image 124(1), in accordance with at least one embodiment, the resulting image 124(N) may correspond to the text overlay 102, the base image 104, and the descriptive data 106. However, distinguishable from the resulting image 124(1), the resulting image 124(N) may include translated text strings that have been translated by the translation service 114 or the localization service 116 and adjusted to accommodate the characteristics of the new language and region (i.e., FR_EU (French in the European Union)). For example, the text string "NEW TABLET!" of the resulting image 124(1) is in English and the corresponding text string of the resulting image 124(N) is in French. The French translation of "new tablet" is longer than its English counterpart and therefore takes up more space. In some examples, the localization service 116 may adjust parameters, for example, relating to height of the text to account for the increase of letters (e.g., "ORDINATEUR TABLETTE!" is a smaller font size than its English counterpart). The same can be said of the other text strings (i.e., "Camera" and "Volume Buttons").

In accordance with at least one embodiment, the locations 126(1)-126(N) may correspond to locations of one or more client devices sharing a network connection with the localization service 116. When the locations 126(1)-126(N) correspond to the locations of one or more client devices, the localization service 116 may wait to determine which translation of the resulting images 124(1)-124(N) to send in response to receiving a request to access one of the resulting images 124(1)-124(N) from one of the one or more client devices. In this example, the request may include a language code indicating the region and language requested by a particular client device that is different from the actual geographic location of the particular client device. Thus, in some examples, the location for purposes presenting the resulting images 124(1)-124(N) may not be the geographic location of a particular client device. In accordance with at least one embodiment, the localization service 116 may generate the resulting images 124(1)-124(N) prior to receiving a request from a client device; rather, the localization service 116 may retain the resulting images 124(1)-124(N) in a cache, or storage, and/or may publish the resulting images 124(1)-124(N) to one or more content delivery networks (CDNs) associated with the localization service 116. This may be desirable to reduce load times associated with presentation of the resulting images 124(1)-124(N) on the client devices.

In some examples, a verification service 128 may be provided. The verification service 128 may be configured to verify translations provided by the translation service 114, the resulting images 124(1)-124(N), and the like. The verification service 128 may be included as a component of the localization service 116 and/or as a standalone application that enables a user to verify translations of text overlays, resulting images (i.e., overlay text (translated or not) saved in connection with images), and the like. In accordance with at least one embodiment, the verification service 128 may receive translations from the translation service 114 via the localization service 116. The verification service 128 may then verify the accuracy of the translations received from the translation service 114.

In accordance with at least one embodiment, the verification service 128 may be configured as a design/edit application which may allow a plurality of verification users spread throughout the world to redesign, edit, and/or adjust resulting images, such as the resulting images 124(1)-124(N). The verification users of the verification service 128 may be associated with the operator of the website on which the webpages, including the resulting images 124(1)-124(N), will be displayed. In this manner, the verification users of the verification service may adjust the resulting images 124(1)-124(N) to better correspond to the base image 104, the text overlay 102, and the descriptive data 106 as originally anticipated by the web designer. Verification may include a verification user accessing and revising a text overlay, a base image, and/or descriptive data associated with one of the resulting images 124(1)-124(N) via a verification application. The verification application may be any suitable graphics editing software including, for example, Photoshop® by Adobe Systems Inc., CorelDraw® by Corel Corporation, GNU Image Manipulation Program (GIMP), or the like. Once verified (e.g., after edits or revisions are made to one of the resulting images 124(1)-124(N)), the verification service 128, or the localization service 116, may publish the verified resulting images 124(1)-124(N) to a CDN associated with the particular verification user of the verification service 128. In accordance with at least one embodiment, the verification service 128 may provide the updates to the localization service 116 which in turn may ensure that images generated in the future will be more suitable.

Figure 2:
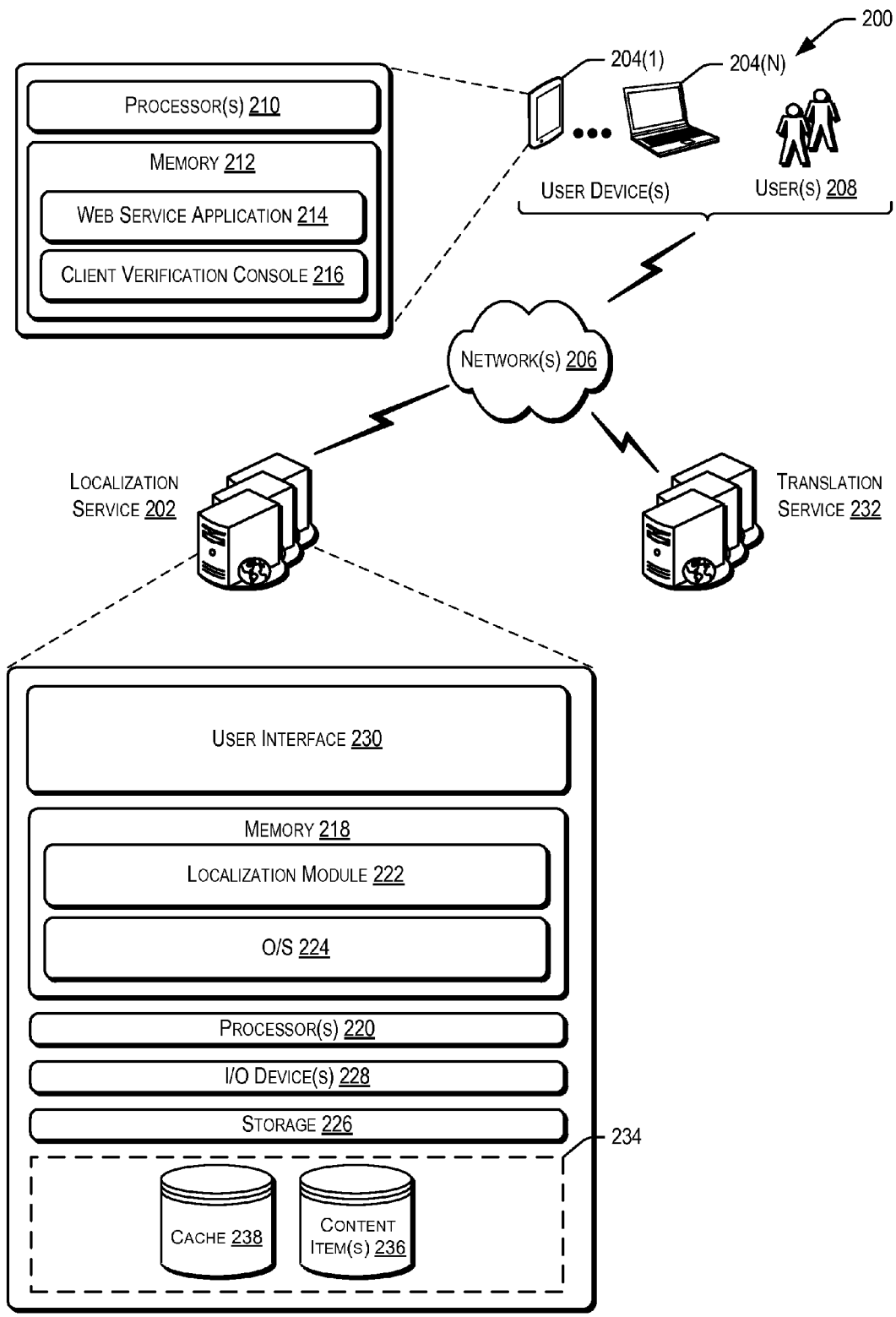
FIG. 2 illustrates an example architecture and device for implementing content localization techniques as described herein, according to at least one example.

Turning next to FIG. 2, an example architecture 200 for implementing image localization techniques as described herein is shown, according to at least one example. The architecture 200 may include localization service 202. The localization service 202 is an example of the localization service 116 discussed with reference to FIG. 1. The localization service 202 may be in communication with user devices 204(1)-204(N) (the user device 204) via one or more network(s) 206 (the network 206). The network 206 may include any one or a combination of many different types of networks, such as cable networks, the Internet, wireless networks, cellular networks, and other private and/or public networks. The user device 204 may be operable by one or more users 208 (the user 208) to access content localized by the localization service 202 via the network 206.

The user device 204 may be any suitable device cable of communicating with the network 206. In some examples, the user device 204 may also be any suitable type of computing device such as, but not limited to, a mobile phone, a smart phone, a personal digital assistant (PDA), a laptop computer, a thin-client device, a tablet PC, a desktop computer, etc. In some examples, the user device 204 may be in communication with the localization service 202 via the network 206, or via other network connections. In some examples, the user device 204 and the user 208 may be associated with the verification service 128 as verification users.

In accordance with at least one embodiment, the user device 204 may be in communication with the localization service 202 via one or more web servers (not shown) connected to the network 206 and associated with the localization service 202. In this manner, the localization service 202 may provide localized content in response to a request from the user device 204 to access web content hosted by the one or more web servers. Thus, in accordance with at least one embodiment, the localization service 202 may provide its content directly to the user device 204, and in accordance with at least another embodiment, the localization service 202 may provide its content to one or more web servers associated with the localization service 202. The user device 204 may be utilized by the user 208 to communicate with the localization service 202. The one or more web servers may include one or more content servers where electronic content (e.g., images, videos, documents, etc.) may be stored. In accordance with at least one embodiment, the localization service 202 may access the content via a retrieval request.

The user device 204 may include at least one memory 212 and one or more processing units (or processor(s)) 210. The processor(s) 210 may be implemented as appropriate in hardware, computer-executable instructions, firmware, or combinations thereof. Computer-executable instruction or firmware implementations of the processor(s) 210 may include computer-executable or machine-executable instructions written in any suitable programming language to perform the various functions described. The memory 212 may include web service application 214 that may allow the user 208 to interact with the localization service 202 and other components of the architecture 200. The web service application 214 may be in the form of a web browser, an application programming interface (API), virtual computing instance, and the like. The memory 212 may also include client verification console 216. In accordance with at least one embodiment, the client verification console 216 may enable the user 208 to perform one or more verification steps on content of the localization service 202. For example, as discussed with reference to the verification service 128, the client verification console 216 may enable the user 208 to provide one or more edits to resulting or translated images.

The architecture 200 may also include a translation service 232. The translation service 232 is an example of the translation service 114 discussed with reference to FIG. 1. The translation service 232 may be connected to the localization service 202 via the network 206. In this manner, the translation service 232 may receive and send translations according to techniques described herein. In accordance with at least one embodiment, the translation service 232 may be operated by a third party and may provide translations according to a contract between the operator of the localization service 202 and an operator of the translation service 232. The translation service 232 and the localization service 202 may also share the same operator. The translation service 232 may include one or more service provider computers, perhaps arranged in a cluster of servers or as a server farm. These servers may include memory for storing computer-executable instructions and processors capable of accessing the memory and executing the computer-executable instructions. The translation service 232 may also include a data store 234 including, for example, language codes, base images with descriptive data and text overlays, translated images, and the like. In some examples, the translation service 232 may provide translated images in response to a request from the localization service 202. In accordance with at least one embodiment, the translation service 232 may provide translated images at a time after completion of translation.

The localization service 202 may include one or more service provider computers, perhaps arranged in a cluster of servers or as a server farm, and may host web service applications of the user device 204. These servers may be configured to host a website (or combination of websites) viewable via the user device 204 or the web service application 214 of the user device 204.

In accordance with at least one embodiment, the localization service 202 may include at least one memory 218 and one or more processing units (or processor(s)) 220. The processor(s) 220 may be implemented as appropriate in hardware, computer-executable instructions, firmware, or combinations thereof. Computer-executable instruction or firmware implementations of the processor(s) 220 may include computer-executable or machine-executable instructions written in any suitable programming language to perform the various functions described.

The memory 218 may include more than one memory and may be distributed throughout many different computer devices. For example, the memory 218, including its contents (e.g., localization module 222), may be distributed throughout a cloud-computing configuration. In a cloud-computing configuration, stored on a single computer device, or otherwise, the memory 218 may store program instructions that are loadable and executable on the processor(s) 220, as well as data generated during the execution of these programs. Depending on the configuration and type of service provider computers including the localization service 202, the memory 218 may be volatile (such as random access memory (RAM)) and/or non-volatile (such as read-only memory (ROM), flash memory, etc.). The localization service 202 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 218 may include multiple different types of memory, such as static random access memory (SRAM), dynamic random access memory (DRAM), or ROM. Turning to the contents of the memory 218 in more detail, the memory 218 may include an operating system 224 and one or more application programs, modules or services for implementing the features disclosed herein including at least the localization module 222.

In accordance with at least one embodiment, the localization service 202 may also include additional storage 226, which may include removable storage and/or non-removable storage. The additional storage 226 may include, but is not limited to, magnetic storage, optical disks, and/or tape storage. The disk drives and their associated computer-readable media may provide non-volatile storage of computer-readable instructions, data structures, program modules, and other data for the computing devices.

The memory 218 and the additional storage 226, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors) that are part of the localization service 202. The modules of the localization service 202 may include one or more components. The localization service 202 may also include input/output (I/O) device(s) and/or ports 228, such as for enabling connection with a keyboard, a mouse, a pen, a voice input device, a touch input device, a display, speakers, a printer, etc.

In accordance with at least one embodiment, the localization service 202 may include a user interface 230. The user interface 230 may be utilized by an operator, designer, or other authorized user to access portions of the localization service 202. In some examples, the user interface 230 may include a graphical user interface, web-based applications, programmatic interfaces such as application programming interfaces (APIs), and the like. In some examples, the user 208 may access the localization service 202 via the user interface 230 to revise and adjust resulting images of the localization service 202.

The localization service 202 may also include data store 234. The data store 234 may include one or more databases, data structures, or the like for storing and/or retaining information associated with the localization service 202. In accordance with at least one embodiment, the data store 234 may include content item database 236 and cache 238. Within the content item database 236 the localization service 202 may store content items, including base images and their associated descriptive data and/or text overlays, received from designers (i.e., initial content items prior to processing by the localization service 202). The initial content items stored in the content item database 236 may be accessible to the translation service 232 when the system decides that the initial content items should be translated. In accordance with at least one embodiment, only the text overlays of the initial content items may be transferred to the translation service 232. Within the cache 238, the localization service 202 may store translated images. In this manner, the translated images may be accessible when requested (e.g., when the user device 204 requests a webpage including a translated image).

Figure 3:
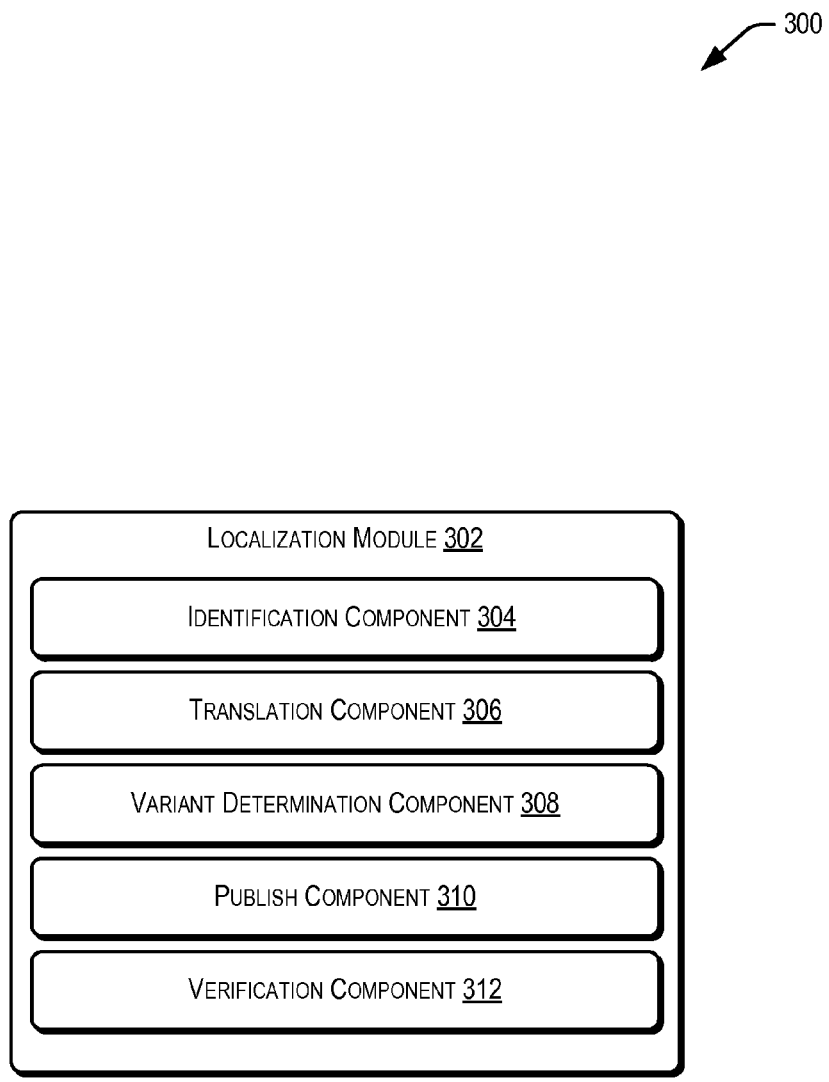
FIG. 3 illustrates an example device for implementing content localization techniques as described herein, according to at least one example.

Turning to the details of localization module 222, stored in the memory 218 of the localization service 202, the localization module 222 may be configured to manage one or more sub-modules, components, and/or services directed to embodiments disclosed herein. As illustrated in FIG. 3, a localization module 302 is provided. The localization module 302 is an example of the localization module 222 stored in the memory 218 of the localization service 202 in accordance with at least one embodiment. The localization module 302 may include identification component 304, translation component 306, variant determination component 308, publish component 310, and verification component 312. While these modules and components are illustrated in FIG. 3 and will be described as performing discrete tasks, it is understood that FIG. 3 illustrates example configurations and other configurations performing other tasks and/or similar tasks as those described below may be implemented according to the techniques described herein. Other modules (not shown) may perform the same tasks as the localization module 302 or other tasks, and may be implemented in a similar fashion or according to other configurations.

Turning first to the identification component 304, in some examples, the identification component 304 may be configured to receive a base image from a designer. In accordance with at least one embodiment, the base image may include a text overlay and descriptive data. The identification component 304 may analyze the base image and, in some examples, separate the text overlay from the base image. This may include unflattening the base image. The identification component 304 may be configured to generate a unique asset identifier for individual base image/text overlay/descriptive data elements and store the base image/text overlay/descriptive data elements in memory of the localization service 202. In this manner, the localization module 302 may easily retrieve the base image, text overlay, and/or descriptive data for processing, providing to a user, and the like. In accordance with at least one embodiment, the identification component 304 may access the base image/text overlay/descriptive data elements via a retrieval request including the asset identifier. The identification component 304 may also identify a language code associated with the base image. This particular language code may provide the base language code used by the translation component 306 or other translation service (e.g., the translation service 232) to translate to text overlay associated with the base image.

Turning next to the translation component 306, in some examples, the translation component 306 may be configured to produce one or more translations of the text overlay received by the identification component 304. Thus, in some examples, the translation component 306 may perform translations of the text overlays instead of, or in addition to, a translation service, such as the translation service 232. Additionally, in some examples, the translation component 306 may determine a plurality of language codes, according to which the text overlay may be translated. The plurality of language codes, along with the plurality of translations, may be stored in memory of the localization service 202.

Turning next to the variant determination component 308, in some examples, the variant determination component 308 may determine translated images (e.g., variants of the base image that include translated text overlays). For example, text overlay X may correspond to image Y and the translation component 306 may translate the text overlay X into three different languages: Spanish, French, and Russian. The resultant text overlays may be identified as X-Spanish, X-French, and X-Russian. The variant determination component 308 may access the image Y and the resultant overlays (i.e., X-Spanish, X-French, and X-Russian) to determine translated images corresponding to each text overlay (e.g., X-Spanish-Y, X-French-Y, and X-Russian-Y). In this manner, the variant determination component 308 may determine translated images or, in other words, images with translated text overlays. The variant determination component 308 may store the translated images in the memory of the localization service 202. For example, the variant determination component 308 may store the translated images in the cache 238 and/or the content item database 236. In this manner, the translated images may be accessible to users and other components of the localization module 302. In accordance with at least one embodiment, the translated images may be stored in connection with unique asset identifiers determined by the identification component 304. In some examples, the variant determination component 308 may provide the translated images to a content and/or web server associated with the localization service 202. The variant determination component 308 may provide codes, indicators, or the like within the different translated images to allow client devices to reproduce the translated images. In some examples, the code, indicators, or the like may be located within the descriptive data associated with a particular translated image.

Turning next to the publish component 310, in some examples, the publish component 310 may be configured to publish the translated images. In accordance with at least one embodiment, publishing the translated images may include sending the translated images to one or more CDNs. For example, once the localization module 302 has ensured that the translated image is accurate, the publish component 310 may perform one or more publication steps which may include noting in descriptive data of the translated image that the translated image is published and sending the translated image to a CDN, cache, or the like. In this manner, the translated image may be provided to users quicker and with less network delay.

Turning next to the verification component 312, in some examples, the verification component 312 may be configured to verify the translated images. In this manner, the verification component 312 may perform steps similar to those described with reference to the verification service 128 of FIG. 1.

Figure 4:
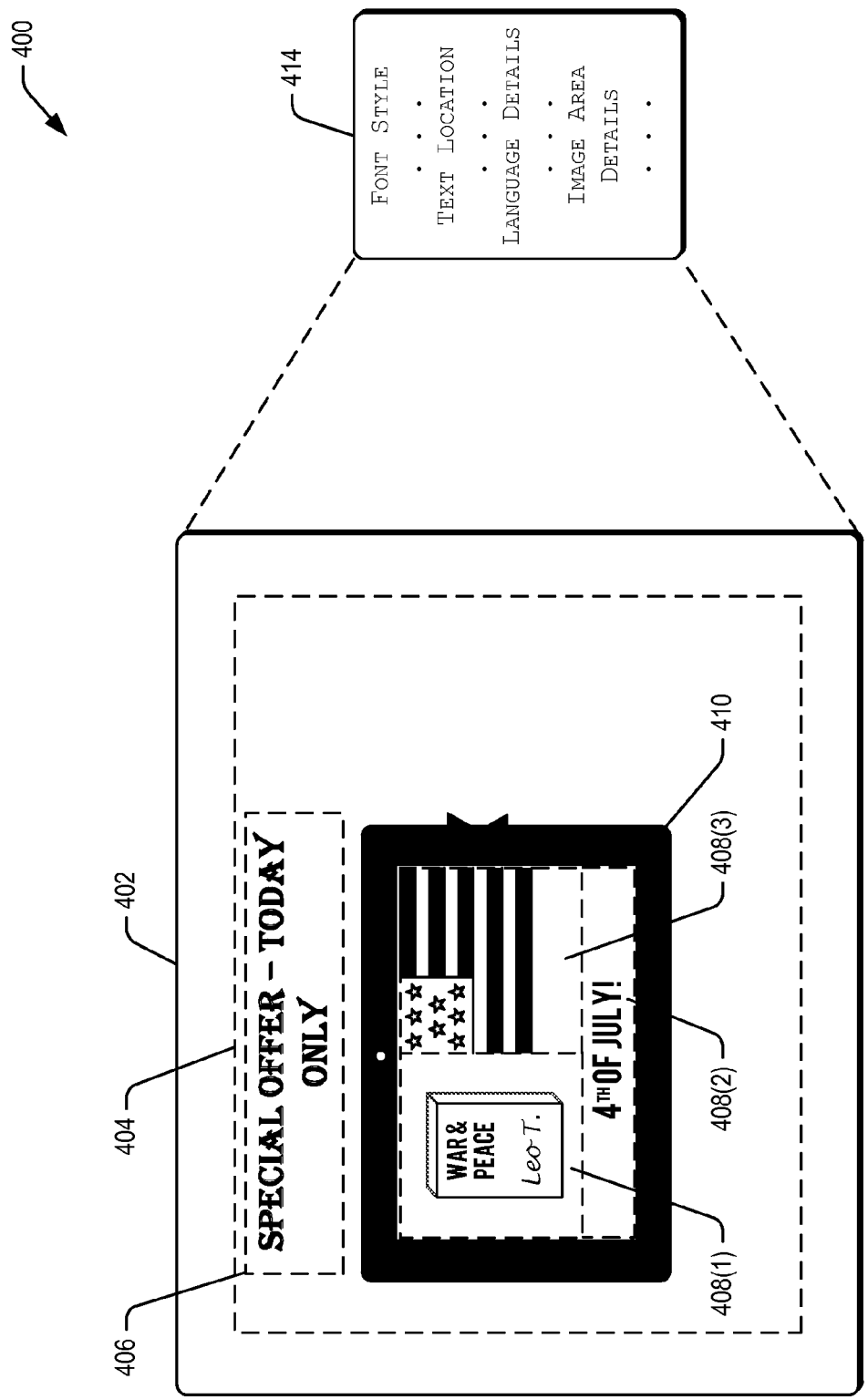
FIG. 4 illustrates an example multi-part localization flow according to content localization techniques described herein, according to at least one example.

Turning next to FIG. 4, FIG. 4 illustrates an example multi-part localization flow 400 according to at least one embodiment of the present disclosure. The multi-part localization flow 400 may include electronic content item 402. The electronic content item 402 may be an image which may be divided up into a plurality of areas (shown by dashed lines). The content (i.e., text and images) of each area of the plurality of areas may be alternated according to localization techniques described herein. For example, in addition to translating text as discussed above, by using techniques described herein, images can be translated depending on region and location as indicated by a language code or other identifier. In some examples, the plurality of areas of the electronic content item 402 may be located within identifying area 404. In FIG. 4, the identifying area 404 may be represented by the dashed rectangle and may include the plurality of areas of electronic content item 402 that may be changed or altered. The electronic content item 402 may include, within the identifying area 404, item 410. In some examples, the item 410 is an example of the item 108 of FIG. 1. The item 410 may be an item for sale in connection with an electronic marketplace, and the electronic content item 402 may be presented as part of a webpage advertising the item 410.

In some examples, certain text elements and non-text elements are presented within the plurality of area. The text and non-text elements may describe one or more features of the item 410. For example, the identifying area 404 may include text area 406. While one text area is illustrated in FIG. 4, it is understood that more text areas or fewer text areas may be provided without departing from the spirit and scope of this disclosure. In some examples, the text area 406 may include text strings that are interchangeable dependent on region, location, season, month, year, time of day, etc. Thus, in this example, the text area 406 may include the text "Special Offer—Today Only" in English. This text string may be included because, as will be discussed later, the item 410 is being offered for sale to users via the electronic marketplace. Using localization techniques described herein, variants of the text area 406 may be alternated depending on a language code.

The item 410, in this example, may be a tablet computer device. As part of presenting the item 410 to users via the webpage, the designer may include examples of different content that may be viewed, read, or otherwise interacted with on the item 410. The examples of content, in addition to descriptive text, may be presented within one of three image areas 408(1), 408(2), or 408(3) of a screen portion of the item 410. Examples of content that may be displayed in the image areas 408(1), 408(2), or 408(3) and that may be changed depending on region may include: books, movies, television shows, music album covers, applications, games, and the like. In certain regions, some of the content listed above may not be available. Thus, it may be desirable to adjust the content within the image areas 408(1), 408(2), and 408(3) such that relevant and/or available content is displayed.

In this example, the screen portion may include three image areas 408(1), 408(2), and 408(3); however, any suitable number of screen areas may be provided including more than three or less than three. Turning first to the image area 408(1) and the image area 408(3), within the image area 408(1) may be provided the book "War and Peace" by Leo Tolstoy, and within the image area 408(3) may be provided an American flag. In this example, this particular book may be relevant and available to a group of users within the region (e.g., United States) and speaking the language (e.g., English) where the electronic content item 402 will be presented. As an additional example, within the image area 408(2) may be presented a text string "$4^{th}$ of July." Since the $4^{th}$ of July is a holiday in the United States, it may be that the electronic content item 402 has been translated and prepared for the region of the United States, in the English language, to be presented on or around the $4^{th}$ of July. In this manner, the plurality of areas of the electronic content item 402 may be altered or adjusted depending on where the electronic content item 402 will be presented and what items will be included in the identifying area 404.

For example, if the region associated with the electronic content item remained the United States, but the language changed to Spanish, then the image of the book within image area 408(1) and the text of the image area 408(2) may be translated to Spanish using the techniques described herein. In this example, the text string of the text area 406 would also be translated to Spanish. The image of the flag within the image area 408(3) could remain the same because it is relevant to all users in the region of the United States, regardless of language. In accordance with at least one embodiment, the techniques described herein may be utilized for selection, translation, transposition, and the like of images within the electronic content item 404.

The details of the different areas of the electronic content item 402 may be included in descriptive data 414. Examples of the type of information that may be included in the descriptive data 414 are shown. The descriptive data 414 may be an example of the descriptive data 106 discussed with reference to FIG. 1. Thus, using the techniques described herein, a localization service may provide the electronic content item 402, including multi-part translation, to different users.

Figure 5:
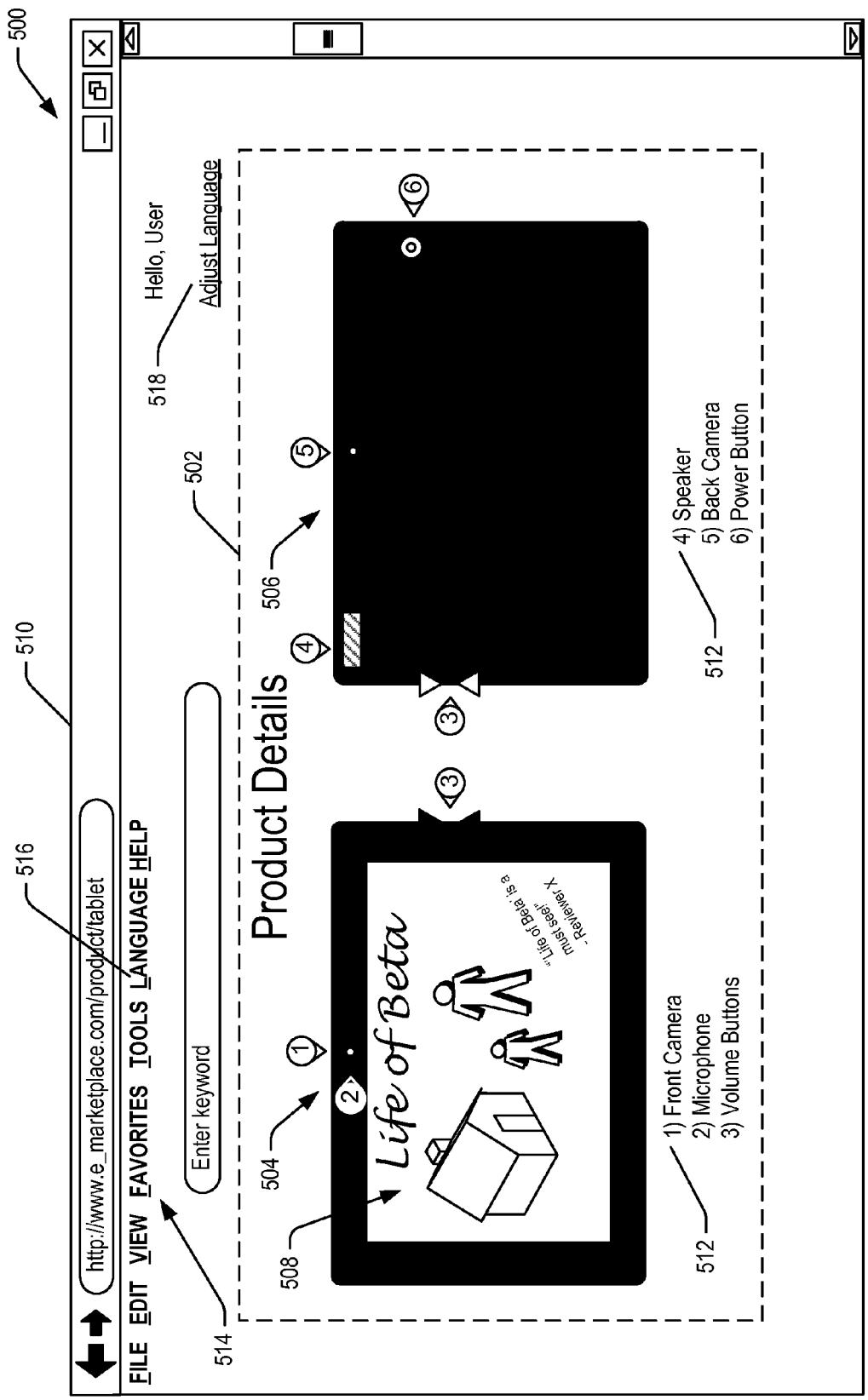
FIG. 5 illustrates an example user interface for displaying content according to content localization techniques described herein, according to at least one example.

Turning next to FIG. 5, FIG. 5 illustrates example user interface 500. In this example, the user interface 500 may be a web browser. The user interface 500 may include webpage 510 which may be presented in English. In accordance with at least one embodiment, within the webpage 510 may be included resulting image 502. In this example, the resulting image 502 may have been previously processed using the localization techniques described herein and is now being presented to a user via the webpage 510 in English. The resulting image 502 may include front product view 504 and back product view 506 relating to an item in the resulting image 502. The front product view 504 may include example screen content 508. As discussed previously, the example screen content 508 is an example of one of the image areas 408(1)-(3) of FIG. 4. In one example, the example screen content 508 may include an image of a movie poster board for a movie entitled "Life of Beta." The movie poster board may also include an image or drawing representative of the movie (e.g., the building and two people) and one or more reviewer remarks. In this example, the movie poster board for "Life of Beta" may be relevant and available in a location where the webpage 510 is being presented. In accordance with at least one embodiment, the example screen content 508 may be translated and/or altered depending on other regions and/or languages where the webpage 510 may be presented. In some examples, only text portions of the example screen content 508 may be adjusted. In some examples, the entire example screen content 508 may be adjusted because the content of the example screen content 508 (e.g., movie poster for "Life of Beta") may not be available within the new location where the webpage 510 will be presented.

In accordance with at least one embodiment, the resulting image 502 may also include descriptive text 512 that may include a list of terms corresponding to number indicators surrounding the front product view 504 and the back product view 506. In some examples, the terms of the descriptive text 512 and their corresponding number indicators may be translated and presented to users using the techniques described herein.

In accordance with at least one embodiment, the user interface 500 may include a tool bar 514. The tool bar 514 may, in some examples, include language tool 516. In some examples, the language tool 516 may be selectable by a user to adjust the language of the user interface 500 to others supported by the user interface 500. In this manner, the user may initiate the localization techniques described herein. In other words, based on a request by the user in the form of adjusting the language via the language tool 516, the system may present a translation of the resulting image 502. In some examples, the language adjustment is implemented as part of the website where the webpage 510 is being hosted. For example, the user may be able to click on adjust language link 518 to adjust the language of a particular webpage (e.g., the webpage 510) or group of webpages associated with the website to which the webpage belongs. In this manner, the system may dynamically adjust the language of elements of the webpage (e.g., the resulting image 502) in response to a user action. The adjustment may take place when the page refreshes, either on its own or in response to user action.

Figure 6:
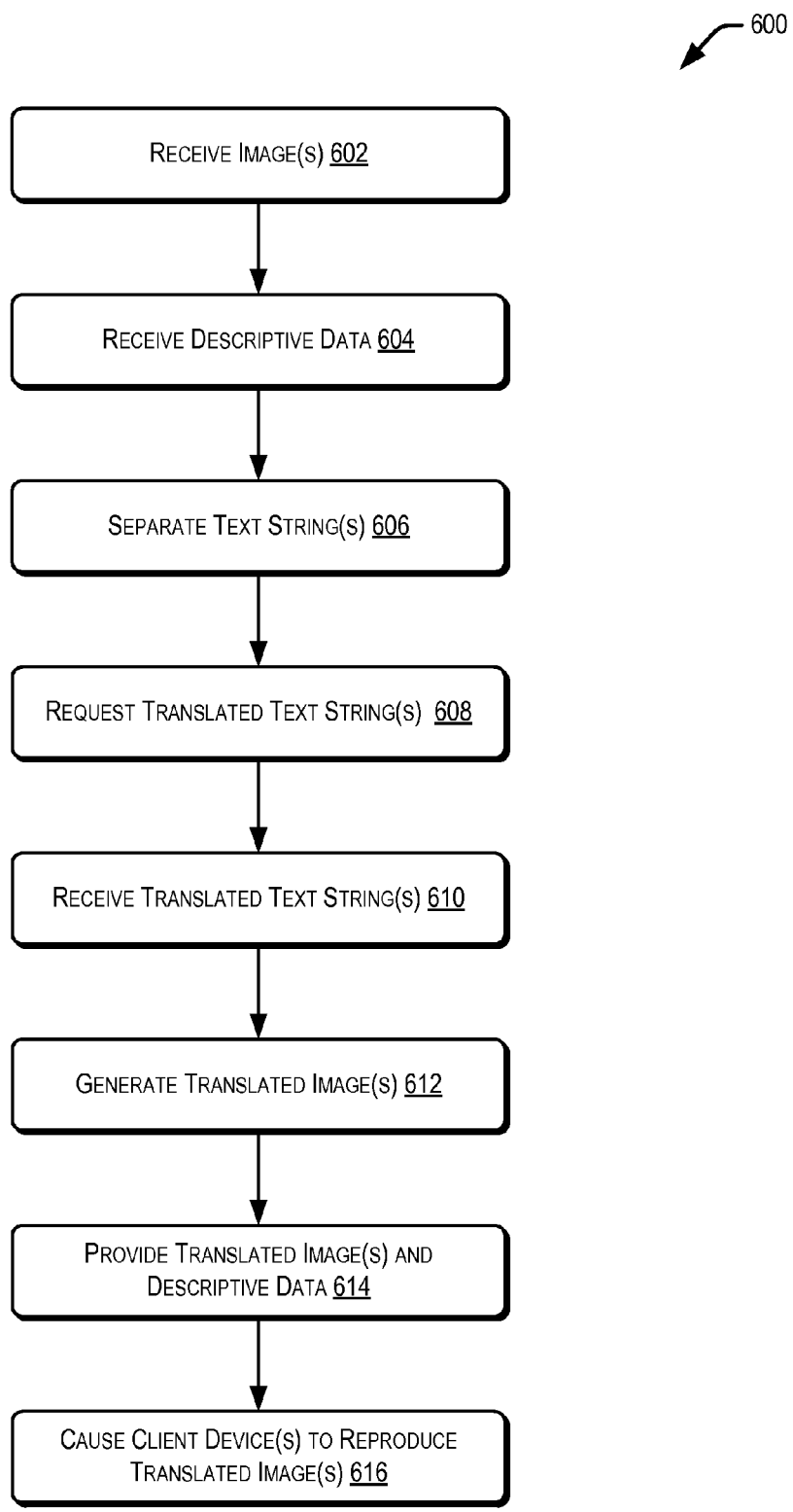
FIG. 6 illustrates an example flow diagram depicting example steps for implementing content localization techniques described herein, according to at least one example.

FIG. 6 depicts an illustrative flow diagram showing process 600 for image localization according to at least one example. The localization module 222 (FIG. 2) of the localization service 202 (FIG. 2) may perform the process 600 of FIG. 6. The process 600 begins at step 602 by receiving image(s). In accordance with at least one embodiment, receiving images may be performed by the identification component 304 (FIG. 3). In some examples, receiving images may include receiving images from one or more designers associated with the localization service 202. In accordance with at least one embodiment, the identification component 304 may receive images with a text string or text overlay included with the images. In some examples, the identification component 304 receives images without a text string or text overlay including with the images. At step 604, the process 600 receives descriptive data. In accordance with at least one embodiment, the identification component 304 may receive descriptive data. The descriptive data may describe the placement and characteristics of text overlays, text strings, images, and the like with respect to the received images. In some examples, the descriptive data may include one or more parameters. At step 606, the process 600 separates text string(s). In accordance with at least one embodiment, the identification component 304 may separate text strings. In some examples, separating text strings may include separating text strings, text overlays, images, and the like from the received images. At step 608, the process 600 requests translated text string(s). In accordance with at least one embodiment, the translation component 306 (FIG. 3) may request translated text strings. In some examples, requesting translated text strings may include providing languages, codes or indications for which translated text strings are requested. Requesting translated text strings may also include requesting translated text overlays, images, and the like based in part on language code(s). In accordance with at least one embodiment, the identification component 304 may request translated text strings from the translation component 306. At step 610, the process 600 receives translated text string(s). In accordance with at least one embodiment, the translation component 306 may receive translated text strings. In some examples, receiving translated text strings may include receiving translating text overlays, images, and the like that correspond to the received text string. In accordance with at least one embodiment, the variant determination component 308 (FIG. 3) may receive translated text strings from the translation component 306. At step 612, the process 600 generates translated image(s). In accordance with at least one embodiment, the variant determination component 308 may generate translated images. In some examples, generating translated images may include generating translated images for predetermined and/or identifiable language codes. For example, generating translated images may include generating translated images for all language codes including the English language or all language codes for the United States region. In accordance with at least one embodiment, generating translated images may include generating translated images based in part on one or more parameters relating to placement and characteristics of the image. At step 614, the process 600 provides the translated image(s) and descriptive data. In accordance with at least one embodiment, the variant determination component 308 may provide the translated images and descriptive data. In some examples, providing the translated images and descriptive data may include providing the translated images and descriptive data to a client device in response to a request from the client device. At step 616, the process 600 may cause client device(s) to reproduce translated image(s). In accordance with at least one embodiment, the variant determination component 308 may cause client devices to reproduce translated images. In some examples, causing client devices to reproduce translated images may include providing text, code, indicators, or the like that are readable by the client devices. In some examples, client devices may be caused to reproduce translated images according to one or more parameters of descriptive data.

Figure 7:
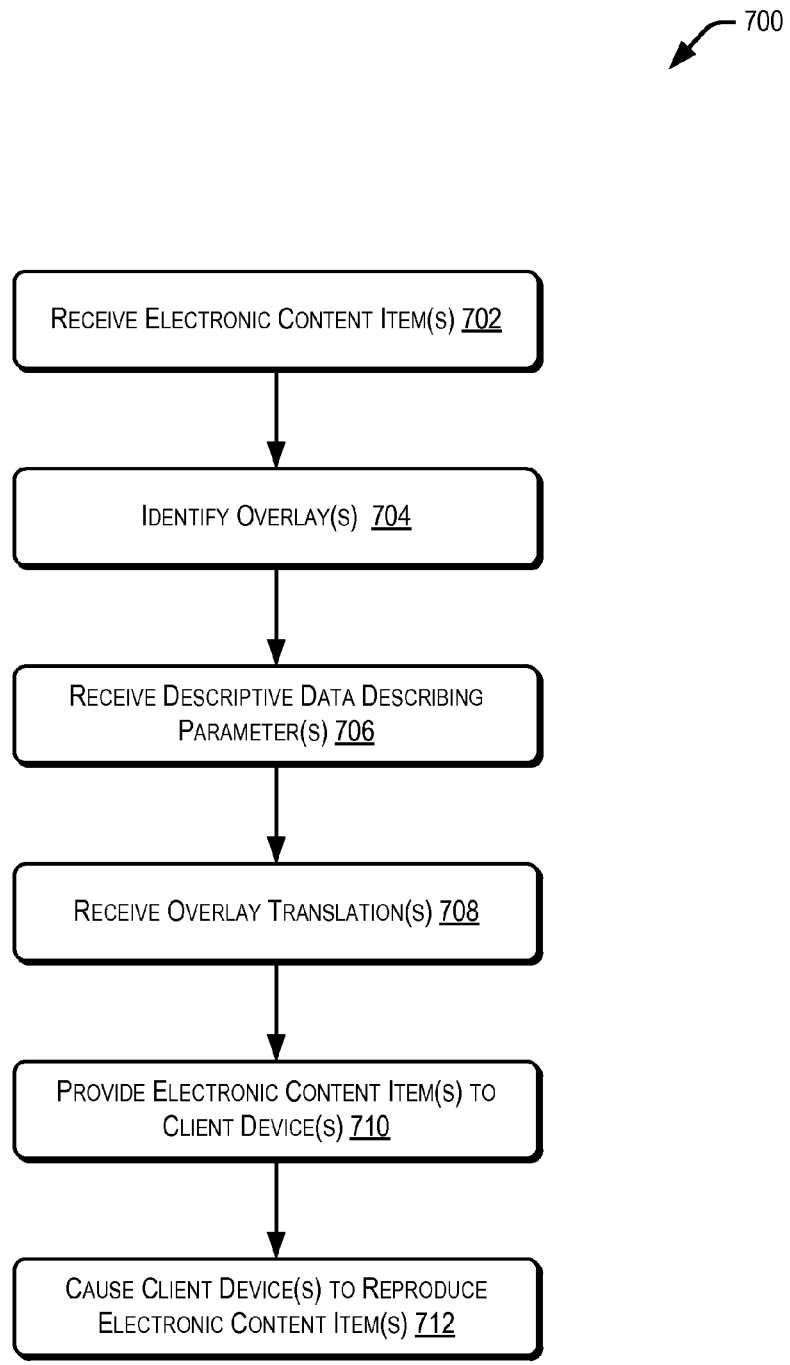
FIG. 7 illustrates an example flow diagram depicting example steps for implementing content localization techniques described herein, according to at least one example.

FIG. 7 depicts an illustrative flow diagram showing process 700 for image localization according to at least one example. The localization module 222 (FIG. 2) of the localization service 202 (FIG. 2) may perform the process 700 of FIG. 7. The process 700 begins at step 702 by receiving electronic content item(s). In accordance with at least one embodiment, the identification component 304 (FIG. 3) may receive electronic content items. In some examples, electronic content items may include one or more overlays corresponding to portions of electronic content items. At step 704, the process 700 identifies overlay(s). In accordance with at least one embodiment, the identification component 304 may identify overlays. In some examples, identifying overlays may include separating overlays from electronic content items via one or more graphic and/or image processing steps. At step 706, the process 700 receives descriptive data describing parameters. In accordance with at least one embodiment, the identification component 304 may receive descriptive data describing parameters. In some examples, the parameters may include placement parameters and/or characteristic parameters and describe the overlays. At step 708, the process 700 receives overlay translation(s). In some examples, receiving overlay translations may include receiving a plurality of overlay translations which may correspond to an overlay and individual language codes. In accordance with at least one embodiment, the identification component 304 may receive overlay translations. At step 710, the process 700 provides electronic content item(s) to client device(s). In accordance with at least one embodiment, the variant determination component 308 (FIG. 3) may provide electronic content items to client devices. In this manner, client devices may have access to electronic content items. In some examples, providing electronic content items to client devices may include providing electronic content items including descriptive data corresponding to the electronic content items to client devices. At step 712, the process 700 may cause client device(s) to reproduce electronic content items. In accordance with at least one embodiment, the variant determination component 308 may cause client devices to reproduce electronic content items. In some examples, causing client devices to reproduce electronic content items may include causing a particular client device to reproduce a particular electronic content item including a particular overlay translation of a plurality of overlay translations in accordance with descriptive data.

Figure 8:
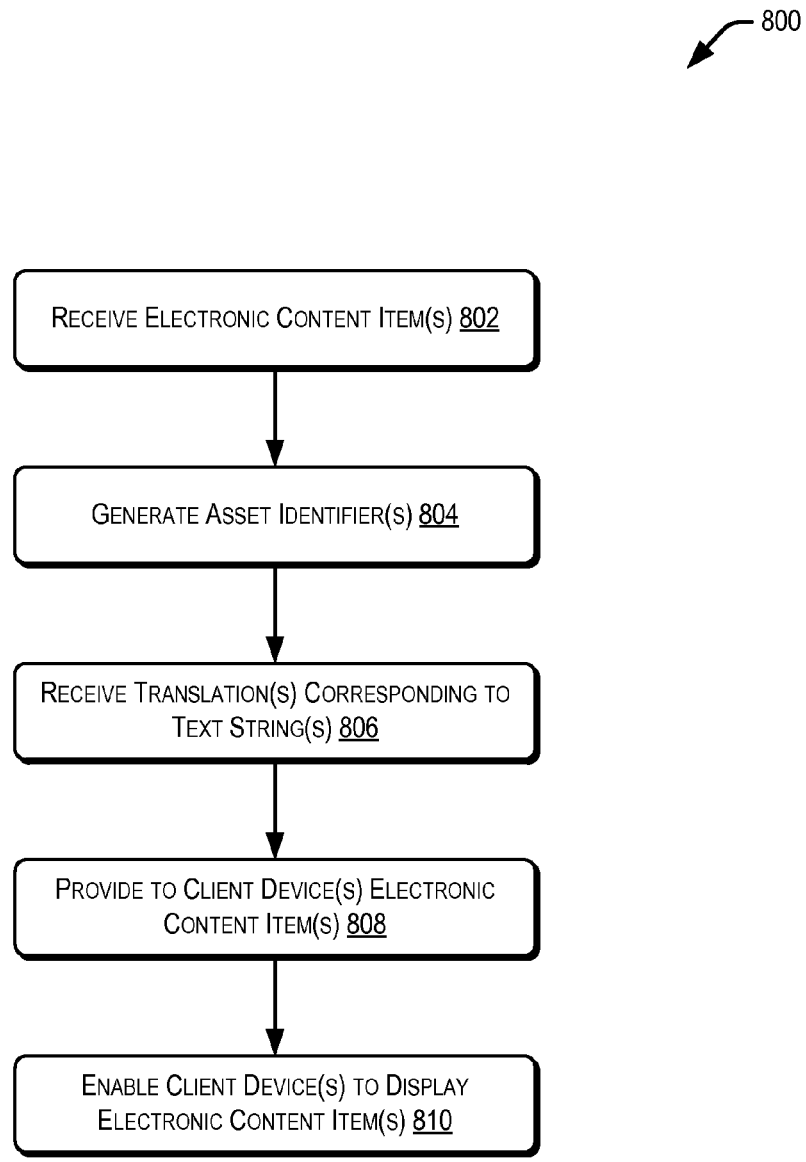
FIG. 8 illustrates an example flow diagram depicting example steps for implementing content localization techniques as described herein, according to at least one example.

FIG. 8 depicts an illustrative flow diagram showing process 800 for image localization according to at least one example. The localization module 222 (FIG. 2) of the localization service 202 (FIG. 2) may perform the process 800 of FIG. 8. The process 800 begins at step 802 by receiving electronic content item(s). In accordance with at least one embodiment, the identification component 304 (FIG. 3) may receive electronic content items. In some examples, receiving electronic content items may include receiving electronic content items including identifying area(s). The identifying areas may include one or more image areas and one or more text areas including one or more text strings. In some examples, receiving may include receiving metadata indicating parameters of identifying areas. At step 804, the process 800 generates asset identifier(s). In accordance with at least one embodiment, the identification component 304 may generate asset identifiers. In some examples, asset identifiers may associate electronic content items with metadata. At step 806, the process 800 receives translation(s) corresponding to text string(s). In accordance with at least one embodiment, the translation component 306 may receive translations corresponding to text strings. In some examples, translations may be based on language code(s). At step 808, the process 800 provides client device(s) electronic content item(s). In accordance with at least one embodiment, the variant determination component 308 may provide client devices electronic content items. In some examples, the providing client devices electronic content items may include providing based in part on asset identifier(s). At step 810, the process 800 enables client devices to display electronic content items. In accordance with at least one embodiment, the variant determination component 308 may enable client devices to display electronic content items. In some examples, enabling client devices to display electronic content items may include enabling with one or more parameters, including translation(s) corresponding to text strings of identifying area(s).

Figure 9:
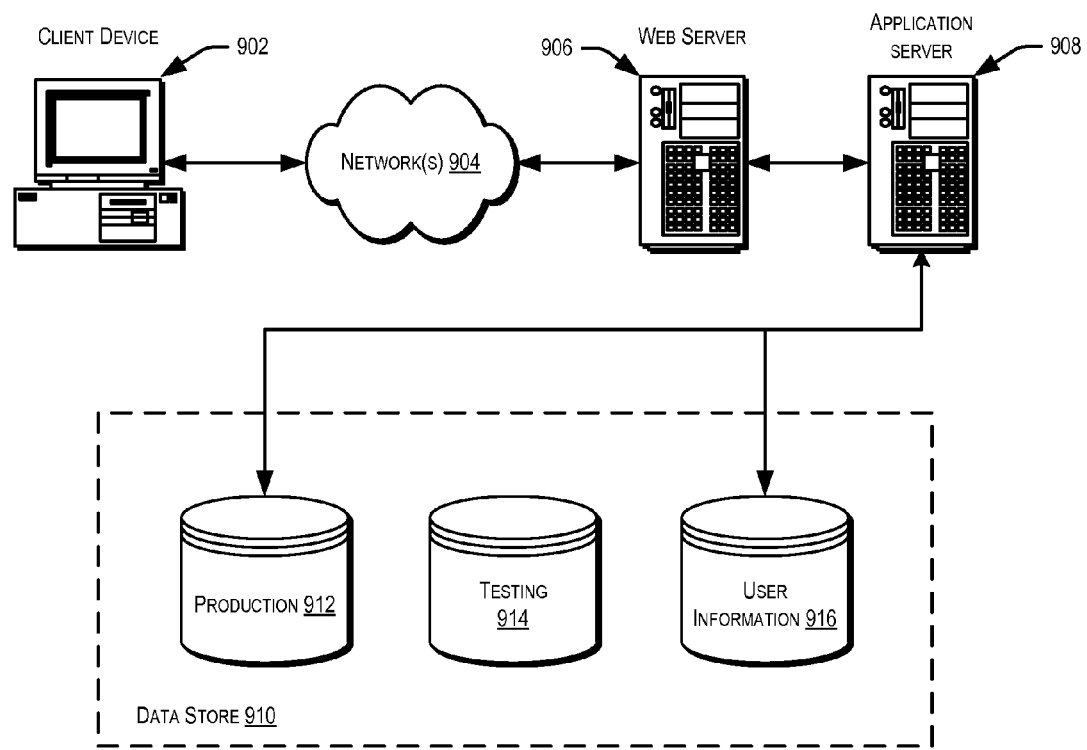
FIG. 9 illustrates an example architecture for implementing content localization techniques as described herein, according to at least one example.

FIG. 9 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any suitable device operable to send and receive requests, messages or information over a suitable network 904 and convey information back to a user of the device. Examples of such client devices include personal computers, cell phones, handheld messaging devices, laptop computers, set-top boxes, personal data assistants, electronic book readers and the like. The network can include any suitable network, including an intranet, the Internet, a cellular network, a local area network or any suitable such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes or components, which may be chained or otherwise configured, which can interact to perform tasks such as obtaining data from an appropriate data store. As used herein the term "data store" refers to any suitable device or combination of devices capable of storing, accessing and retrieving data, which may include any suitable combination and number of data servers, databases, data storage devices and data storage media, in any suitable standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the electronic client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In some examples, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the electronic client device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the environment 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of suitable applications. User or client devices can include any suitable number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of suitable commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infra-red network, a wireless network and any suitable combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any suitable method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any suitable medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or example-like language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to be present.

Preferred embodiments of this disclosure are described herein, including the best mode known to the inventors for carrying out the described embodiments. Variations of those preferred embodiments may become apparent to those of ordinary skill in the art upon reading the foregoing description. The inventors expect skilled artisans to employ such variations as appropriate and the inventors intend for the embodiments disclosed herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, by a computer system, an image;
   receiving descriptive data associated with the received image, the descriptive data describing one or more parameters associated with presentation of a text string corresponding to the received image, the one or more parameters indicating at least one of placement of text with respect to the text string, font style of text with respect to the text string, or font size of text with respect to the text string;
   extracting the text string from the descriptive data;
   generating an asset identifier associating the image and the descriptive data;
   storing the image and the descriptive data in association with the asset identifier;
   requesting a translated text string corresponding to the extracted text string based at least in part on the asset identifier, the translated text string translated based at least in part on at least one of a regional identifier or a language identifier;
   receiving, from a translation service, the translated text string corresponding to the extracted text string;
   generating, according to the one or more parameters, a translated image that includes the received translated text string as an overlay that is configured to be overlaid on top of the image;
   providing, by the computer system, the translated image and the descriptive data to a client device in response to a request; and
   causing the client device to reproduce the translated image including the translated text string as the overlay according to the one or more parameters of the descriptive data.

2. The computer-implemented method of claim 1, wherein the one or more parameters comprise rule parameters indicating placement of the text string with respect to the image and characteristic parameters indicating style of the text string.

3. The computer-implemented method of claim 1, wherein the request comprises a request by the client device to access content.

4. The computer-implemented method of claim 1, wherein the text string describes one or more characteristics of an item depicted by the image, the item depicted by the image available in connection with an electronic marketplace.

5. The computer-implemented method of claim 1, wherein receiving the image comprises receiving, from a first user device, a data upload comprising the image.

6. A computer-implemented method, comprising:
receiving, by a computer system, an image;
receiving data associated with the image, the data including a plurality of parameters describing presentation of the image, individual parameters of the plurality of parameters corresponding to at least one of characteristic parameters or rule parameters;
generating an asset identification code, the asset identification code identifying at least the image and the data;
storing the image and the data in association with the asset identification code;
receiving a translation of a text string based at least in part on a request that includes the asset identification code, the translation of the text string comprising a translated text string corresponding to a language code that comprises a regional identifier and a language identifier, the regional identifier indicating a particular geographic region and the language identifier indicating a particular language supported within the particular geographic region;
providing the image including the translated text string to a user device in accordance with the plurality of parameters; and
causing the user device to display the image based in part on the language code and the plurality of parameters, the displayed image including the translated text string.

7. The computer-implemented method of claim 6, wherein the rule parameters comprise at least one of a spacing parameter, a placement parameter, a widow/orphan parameter, a character-spacing parameter, a hyphenation parameter, a boundary parameter indicating at least a boundary of an overlay, a special character parameter, a text flow parameter, or a directional text parameter, and wherein the characteristic parameters comprise at least one of a text parameter, a font parameter, a size parameter, a non-text element parameter, a color parameter, or a text style parameter.

8. The computer-implemented method of claim 6, wherein providing the image includes providing the image in response to a different request from the user device to access the image.

9. The computer-implemented method of claim 6, wherein the text string comprises a first language and the translated text string comprises a second language, the first language distinct from the second language.

10. The computer-implemented method of claim 6, further comprising providing the text string and the data to a translation service, the translation service configured to translate the text string between one or more languages and update the data.

11. The computer-implemented method of claim 6, further comprising:
providing the image including the translated text string to a second user device;
enabling performance of one or more adjustments to the translated text string and the image;
updating the data associated with the image to reflect the one or more adjustments to the translated text string and the image; and
causing the user device to display the image including the translated text string in accordance with the updated data reflecting the one or more adjustments to the translated text string.

12. The computer-implemented method of claim 6, wherein providing the image is based at least in part on receiving, from the user device, a different request to access a page associated with the image.

13. The computer-implemented method of claim 6, wherein:
the method further comprises, prior to providing the image including the translated text string to the user device:
generating a translated image comprising the translation of the text string as an overlay configured to be overlaid on the image; and
publishing the translated image to a content delivery location; and
providing the image including the translated text string comprises allowing the user device to access the translated image from the content delivery location.

14. A system comprising:
memory that stores computer-executable instructions; and
a processor configured to access the memory and execute the computer-executable instructions to collectively at least:
receive an electronic content item;
receive an overlay that comprises a text string;
receive descriptive data describing one or more parameters of the overlay with respect to the electronic content item;
generate an asset identifier associating the electronic content item and the descriptive data;
store the electronic content item and the descriptive data in association with the asset identifier;
receive a plurality of overlay translations based at least in part on the asset identifier, individual overlay translations comprising translated text strings corresponding to the text string;
provide the electronic content item, including the descriptive data, to a client device; and
cause the client device to reproduce the electronic content item including one overlay translation of the individual overlay translations based in part on the descriptive data and a language code associated with the one overlay translation, the one overlay translation being configured to be overlaid on top of the electronic content item.

15. The system of claim 14, wherein the processor is further configured to access the memory and execute the computer-executable instructions to collectively at least:
publish a final electronic content item including a final overlay translation of the plurality of overlay translations based in part on final descriptive data and a final language code associated with the final overlay translation; and
allow access to the final electronic content item via a network by a plurality of client devices.

16. The system of claim 14, wherein the one or more parameters comprise rule parameters indicating placement of text of the overlay with respect to the electronic content item and characteristic parameters indicating style of the text of the overlay.

17. The system of claim 16, wherein the rule parameters comprise at least one of a spacing parameter, a placement parameter, a widow/orphan parameter, a character-spacing parameter, a hyphenation parameter, a boundary parameter indicating at least a boundary of the overlay, a special character parameter, a text flow parameter, or a directional text parameter; and the characteristic parameters comprises at least one of a text parameter, a font parameter, a size parameter, a non-text element parameter, a color parameter, or a text style parameter.

18. The system of claim 14, wherein:
the processor is further configured to access the memory and execute the computer-executable instructions to collectively at least:
receive a request from the client device to access content; and
detect a region-language combination associated with the client device; and
causing the client device to reproduce the electronic content item including the one overlay translation is based at least in part on the region-language combination.

19. One or more computer-readable storage devices for storing computer-executable instructions that, when executed by one or more computer systems, configure the one or more computer systems to perform operations, comprising:
receiving an electronic content item including an identifying area;
receiving a text string corresponding to the identifying area;
receiving metadata indicating parameters of the identifying area;
generating an asset identifier associating the electronic content item and the metadata;
storing the electronic content item and the metadata in association with the asset identifier;
receiving a translation corresponding to the text string, the translation based in part on a language code that comprises a regional identifier and a language identifier, the regional identifier indicating a particular geographic region and the language identifier indicating a particular language supported within the particular geographic region;
providing a client device the electronic content item based in part on the asset identifier; and
enabling the client device to display the electronic content item in accordance with the parameters, the electronic content item, when displayed, including the translation corresponding to the text string.

20. The one or more computer-readable storage devices of claim 19, wherein the text string describes a feature of the electronic content item.

21. The one or more computer-readable storage devices of claim 19, wherein the electronic content item includes an image area and the parameters comprise rule parameters indicating arrangement of the identifying area and arrangement of the image area with respect to display of the electronic content item, and characteristic parameters indicating style of the identifying area.

22. The one or more computer-readable storage devices of claim 21, wherein the electronic content item includes an item for sale in connection with an electronic marketplace, the image area being associated with the item and including an image depicting a feature or a use of the item for sale in connection with the electronic marketplace.

23. The one or more computer-readable storage devices of claim 21, wherein the image area includes an image, and wherein the computer-executable instructions further configure the one or more computer systems to perform operations comprising:
receiving an image translation corresponding to the image of the image area, the image translation translated based in part on the language code;
replacing the image with the image translation according to the parameters; and
enabling the client device to display the electronic content item in accordance with the metadata, the electronic content item, when displayed, including the image translation corresponding to the image of the image area.

24. The one or more computer-readable storage devices of claim 19, wherein the text string comprises a first language and the translation corresponding to the text string comprises a second language, the first language distinct from the second language.

* * * * *